(12) United States Patent
Lu et al.

(10) Patent No.: US 7,803,456 B2
(45) Date of Patent: Sep. 28, 2010

(54) GLASS BONDED CERAMIC STRUCTURES

(75) Inventors: Yanxia Lu, Painted Post, NY (US); Robert Michael Morena, Caton, NY (US)

(73) Assignee: Corning Incorporated, Corning, NY (US)

( * ) Notice: Subject to any disclaimer, the term of this patent is extended or adjusted under 35 U.S.C. 154(b) by 398 days.

(21) Appl. No.: 11/897,110

(22) Filed: Aug. 29, 2007

(65) Prior Publication Data
US 2008/0057268 A1 Mar. 6, 2008

Related U.S. Application Data

(60) Provisional application No. 60/840,766, filed on Aug. 29, 2006.

(51) Int. Cl.
*B32B 3/12* (2006.01)
*B32B 3/26* (2006.01)

(52) U.S. Cl. .................. 428/313.3; 428/116; 428/117; 428/118; 428/313.9; 428/316.6; 428/319.1

(58) Field of Classification Search ............. None
See application file for complete search history.

(56) References Cited

U.S. PATENT DOCUMENTS

| 2,997,402 A | 8/1961 | McDonald et al. ............ 106/63 |
| 4,331,773 A | 5/1982 | Hongo et al. ............... 501/128 |
| 4,640,899 A | 2/1987 | Hillig et al. .................... 501/5 |
| 4,868,142 A | 9/1989 | Waisala et al. ................ 501/85 |
| 6,716,512 B2 | 4/2004 | Yamamoto et al. .......... 428/116 |
| 2005/0115214 A1 | 6/2005 | Saha et al. .................... 55/523 |
| 2005/0239640 A1 | 10/2005 | Nilsson et al. .............. 502/202 |
| 2006/0037297 A1 | 2/2006 | Hijikata ....................... 55/523 |
| 2006/0213165 A1* | 9/2006 | Isomura et al. ............... 55/523 |

* cited by examiner

*Primary Examiner*—Ling Xu
(74) *Attorney, Agent, or Firm*—Matthew B. McNutt

(57) ABSTRACT

Glass-bonded ceramics made of non-microcracked non-oxide or oxide ceramic particles which are bound together by glass into a unitary non-microcracked structure are disclosed. Such ceramics are suitable for use in substrates and filters, such as a diesel particulate filter.

6 Claims, 2 Drawing Sheets

GLASS BONDED CERAMIC STRUCTURES

RELATED APPLICATIONS

This application claims the benefit of U.S. Provisional Application Ser. No. 60/840,766, filed Aug. 29, 2006, entitled "Glass Bonded Ceramic Diesel Particulate Filters," the disclosure of which is hereby incorporated by reference herein.

BACKGROUND

The present invention pertains to glass bonded ceramic structures, such as glass bonded ceramic honeycomb structures, and a method of making thereof.

It is well known that cordierite is a good candidate for diesel particulate filter (DPF) applications due to its low Young's (elastic) modulus (E), good modulus of rupture strength (MOR), and favorably low coefficient of thermal expansion (CTE). Much activity has been devoted to the development of these materials for heavy duty and light duty diesel application in recent years. Cordierite bodies derive their low thermal expansion characteristics from the microcracks present in its microstructure. The thermal expansion coefficient becomes negative when these micro-cracks close up, giving cordierite a very low thermal expansion over a broad temperature range. However, the presence of microcracks correspondingly reduces the strength of cordierite, which makes it prone to cracking during the periodic filter regenerations that are needed to remove trapped soot from the filters by controlled combustion. Cracking is the prime cause of failure in cordierite-based DPFs. In general, ceramics with micro-cracked microstructures have limited strength, and also have the potential for thermal growth after thermal recycles that will further reduce the strength of body.

Glass-bonded ceramics comprise one of the approaches to forming strong ceramic bodies. U.S. patent application Ser. No. US 20050115214 A1, for example, discloses ceramics incorporating glass phases that are precipitates from mullite precursors, such as clays that contain iron and magnesium impurities. The glass phase is distributed on at least a portion of the acicular mullite grains at the mullite grain surfaces and at intersecting grain surfaces. These glass phases reportedly strengthen the mullite body, which makes mullite strong enough to survive in the diesel exhaust system. However, since the glass phase is not originally designed in the composition, its quantity and distribution are not well controlled.

In addition, the bonding between the mullite grains and the glass phase is sensitive to the mullite firing history. A special firing cycle for forming the glass phase becomes necessary. The lack of control over such glass phases may also affect the pore structure of mullite; thus the product structure cannot be reliably reproduced.

U.S. patent application Ser. No. 20050239640 A1 proposes strengthening porous cordierite bodies via a glass phase containing boron oxide. The method of forming the glass phase is to expose a porous body to a source of boron and then to heat the body in an oxygen containing atmosphere. The strength increases because of the fusion of ceramic grains with the oxide glass phase containing boron. However, formation of the glass phase is an intricate and prolonged process. Further, the evaporation of boron at high temperature could lead to loss of the glass phase during diesel regeneration thereby weakening the structure and leading to early failure. The process is primarily suited to oxide ceramics; controlling the oxidation of non-oxide ceramics, such as SiC, is not deemed practical.

Many known processes in this field rely on forming a glass phase in-situ in the ceramic matrix during thermal processing. The resulting glass phase is not well controlled because of the dependence on non-equilibrium thermodynamic processes. Further, the process times tend to be long. The porosity of the resultant ceramic body may be variable and is not under control.

SUMMARY

This invention seeks to overcome the above deficiencies by providing glass-bonded ceramic bodies, and in particular non-microcracked glass-bonded ceramic bodies, with improved properties, including thermal properties enabling the use of the non-microcracked ceramics for DPF applications. Bodies comprised of ceramic particles or grains, and in particular non-microcracked refractory ceramic particles or grains, bound by glass are disclosed herein.

Disclosed herein are glass-bonded ceramic bodies, or structures, such as honeycomb structures that can be formed into DPF filters with non-microcracked microstructures that exhibit high thermal shock resistance (TSR) and therefore the ability to withstand severe temperature excursions such as are encountered in DPF regeneration cycles. The invention further provides high-strength glass-bonded ceramic materials suitable for DPF applications wherein the materials do not develop microcracks during processing. Included among these materials are non-microcracked, glass-bonded ceramics such as SiC, Si—SiC, zircon, alumina, alumina titanate and $Si_3N_4$—SiC composites.

In a further aspect, the invention provides a method of making ceramic products, such as a DPF, using glass-bonded ceramics such as above described that preferably provides ceramic microstructures substantially free of microcracks, and wherein the glass phases are pre-formed. Preferably, there are substantially no microcracks in the glass phase. In some embodiments, preformed ceramic particles are mixed with glass (i.e. preformed glass, or glass frit, whose composition is fixed but whose shape can vary) along with a binder and a lubricant. In some embodiments, preformed ceramic particles are mixed with glass (i.e. preformed glass, or glass frit, whose composition is fixed but whose shape can vary) along with a binder and a lubricant, and the mixture is heated to a temperature below the sintering temperature of the ceramic particles. For the purposes of the present description the term "glass-bonded ceramic" is used to distinguish the instant invention from known ceramics that may contain one or more glass phases formed in-situ in the matrix, as for example a glass phase formed in-situ from glass-forming ingredients. In the instant invention glass is intentionally added as an ingredient to the ceramic powder mix. The glass melts during fabrication of the ceramic body and acts as a bonding agent between ceramic grains in the material. The glass does not constitute a phase within the ceramic grains, rather the glass binds the ceramic grains together into a network, preferably an interconnected porous network.

BRIEF DESCRIPTION OF THE DRAWINGS

The invention is further described below with reference to the accompanying drawings, wherein.

DETAILED DESCRIPTION

Generally speaking, the present invention is directed to glass-bonded ceramic bodies, or structures, such as filter structures like DPFs. The structures may comprise non-oxide bearing ceramic material and/or oxide ceramic material, for example as the matrix material of an extruded honeycomb structure such as a DPF. The glass binder of the instant invention is glass which is preformed before addition to the ceramic particles, wherein the glass binding the ceramic particles is not a phase of the ceramic phase, i.e. the glass phase is not a phase of the grains of the ceramic phase.

Figure 1:
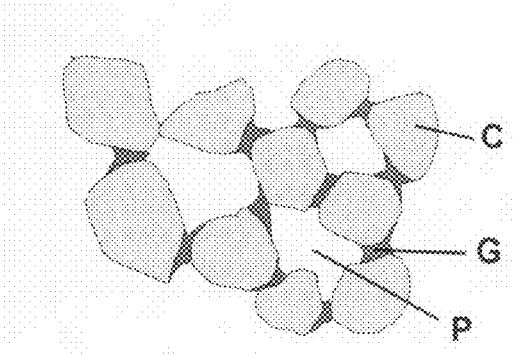
FIG. 1 schematically depicts the two-dimensional pore structure of a glass bonded ceramic structure, such as a filter.

An exemplary microstructure of a glass-bonded ceramic of the instant invention is shown in FIG. 1 of the drawing. The two dimensional pore structure of the glass-bonded ceramic material (which is suitable for use in a DPF) illustrates ceramic particles (C) bonded with fine glass (G) forming a matrix of open pores (P). Unlike known glass phases in connection with ceramics, the glass of the instant invention is a bonding agent for the grains of the ceramic phase as shown. The neck bond is formed when the externally added glass softens during heating and wets the ceramic particles, and then cools to form a rigid bond. That is, the mixture is heated sufficient to soften the glass, but below the ceramic sintering temperature. In some embodiments, the mixture is heated above the glass transition temperature of the glass. Preferably, the mixture is heated but insufficient to allow the glass to run or drip from the ceramic particles; in some embodiments, the viscosity of the glass is greater than $10^3$ poise even during heating. For example, in embodiments where the ceramic particles are formed into a formed structure, such as via extrusion of a mixture of ceramic particles and glass with a binder and a lubricant to form an extruded structure, the extruded structure is heated sufficient to soften the glass but insufficient to cause the glass to run or drip from the extruded structure, and/or insufficient to cause slumping or distortion of part or all of the structure. After heating, the extruded structure is allowed to cool, thereby forming glass bonds between the ceramic particles, to form a glass-bonded ceramic body. The bonding between ceramic particles is preferably substantially due to glass bonding (as opposed to ceramic-ceramic bonding by ceramic sintering). In some embodiments, some ceramic-ceramic bonding by ceramic sintering may occur. In other embodiments, the bonding between ceramic particles is solely due to glass bonding (with no ceramic-ceramic bonding by ceramic sintering).

The use of non-microcracked ceramics expands the field of material suitable in the present invention beyond microcracked ceramics such as cordierite and sintered ceramics such as SiC. The ceramic particles suitable for use in filter or substrate applications (such as DPF) can include any ceramics with refractory properties and chemical resistance to ash and which are available in powder forms, and in some embodiments having broad particle size distributions. In contrast, the glasses for binder materials must be selected to meet the thermal and chemical requirements for the substrate or filter (e.g. DPF) applications.

The bodies (e.g. filters) of the invention have flexible pore structures. Similar to currently available sintered SiC filters, the pore sizes and porosities can be adjusted by selecting the particle size of the ceramic powders and the percentage of glass bonding agent. Flexible pore structure brings a great benefit for filter applications, including in addition to DPFs, products such as catalyzed soot filters, 4-way catalyst filters, and high porosity filters. When the pore structure required differs from one application to another, the particle sizes of raw materials can be adjusted to develop a ceramic structure meeting the new requirements.

Figure 4:
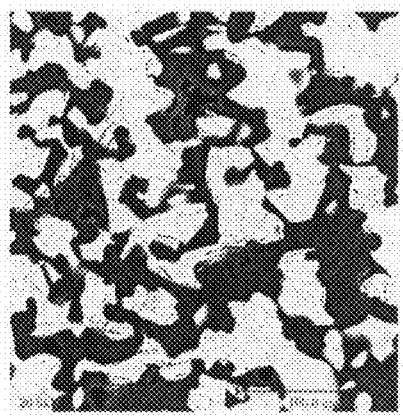
FIG. 4 is an electron photomicrograph of a further example of a glass bonded SiC ceramic material.
Figure 2:
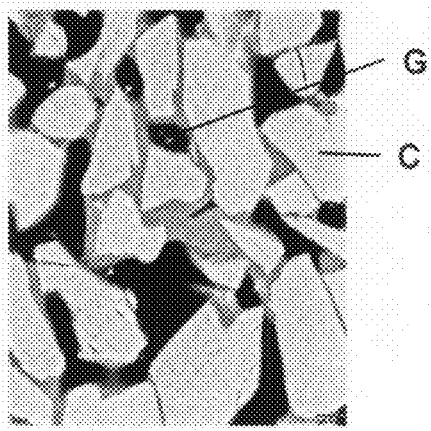
FIG. 2 is an electron photomicrograph of a fabricated glass-bonded SiC ceramic structure, such as a filter.
Figure 3:
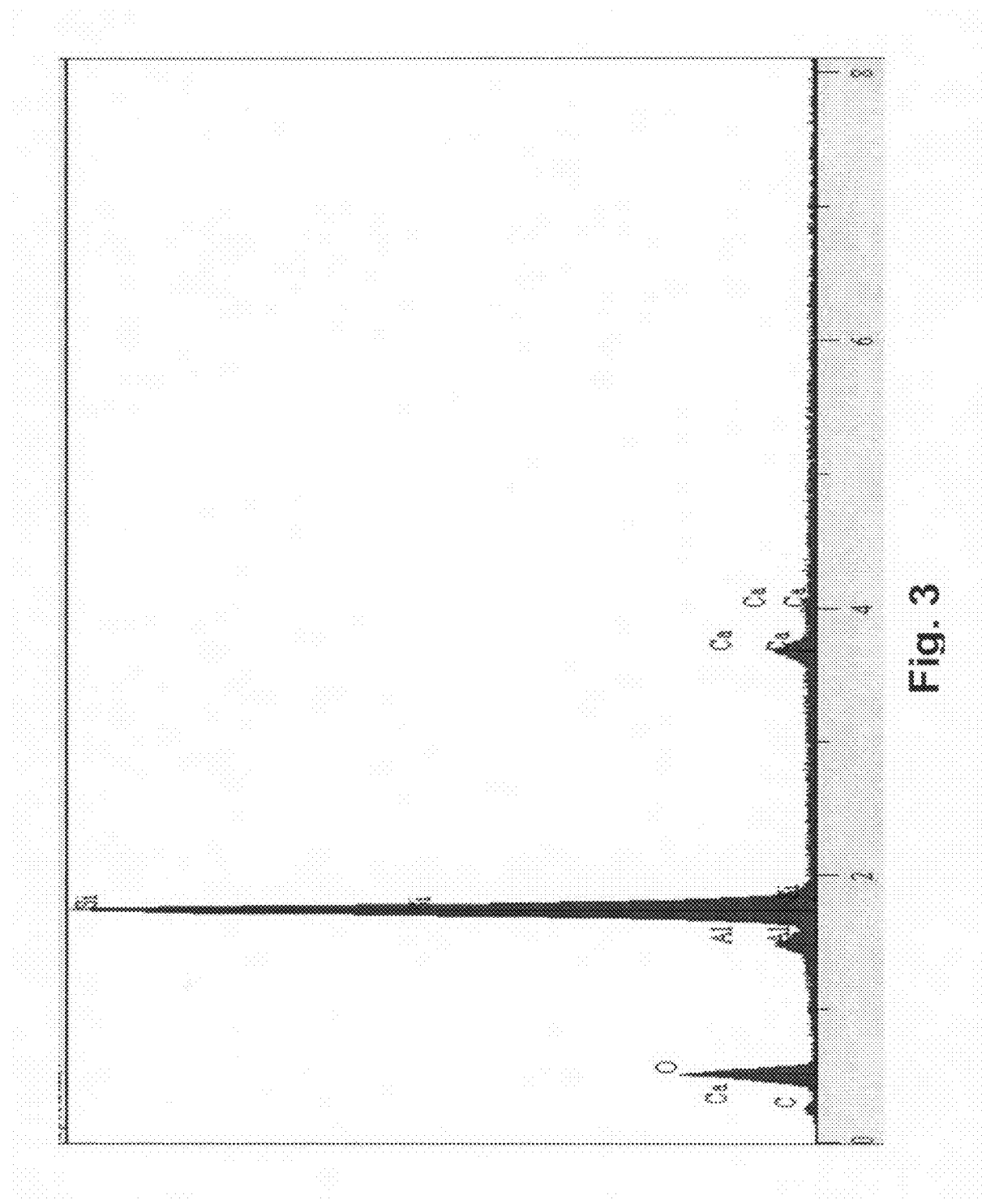
FIG. 3 is the output plot from an energy dispersive x-ray (EDX) analysis of the glass phase of FIG. 2 showing Ca and Si and Al peaks comprising the glass.

FIGS. 2-4 of the drawings illustrate the range of structures attainable in glass-bonded SiC ceramic systems. FIG. 2 is an electron photomicrograph illustrating the microstructure of a porous filter fabricated from coarse grained SiC powder (C) and a calcium-silicate glass binder (G). FIG. 3 is the output plot from an energy dispersive x-ray (EDX) analysis of the glass phase of FIG. 2 showing Ca and Si and Al peaks comprising the glass. This microstructure may be compared to the fine-grained structure of another glass-bonded SiC filter illustrated in FIG. 4 of the drawings, wherein a finer assemblage of ceramic particles, pores and glass bonding has been provided.

The production of ceramic filters in accordance with the invention may be carried out through the application of conventional honeycomb extrusion processes and equipment. Ceramic and glass powders are mixed with binders, lubricants, and optionally pore formers, known in the art. The powders are dry mixed and/or wet mixed as needed to form a composition with suitable consistency for extrusion. The extruded shape may be dried if needed and thermally processed at a low temperature to soften the glass and bond the ceramic particles.

The ceramics selected for the production of DPFs have to be refractory with excellent chemical resistance to ash composition in diesel exhaust system. The candidate ceramics include, but are not limited to, SiC, sintered cordierite, alumina, mullite, zircon, aluminate silicate, aluminum titanate, and the like. Particle sizes and size distributions can be rigorously controlled to provide the type of filter microstructure required. In general, however, the mean particle sizes of the ceramic powders used will be in a range from 10-40 um for the production of porous filters with median pore sizes ($d_{50}$) in a range of 7-30 µm. The porosity of such filters will be in a range of 40%-60%. To obtain highly porous bodies, pore formers such as graphite, starch, PE or PMMA, may be added.

Glass compositions suitable for use as bonding agents are those suitable for high temperature applications. Just as in the case of the ceramic component, the glass must be chemically durable in a diesel exhaust system, e.g., it must be chemically resistant to iron, cerium, and the like at high temperatures. Additionally, it is important that the glass composition not contain any chemical constituents that will volatilize, or be reduced during operation of the diesel filter. Examples of undesirable constituents include $P_2O_5$, as well as small alkali species such as $Li_2O$. Glass families of particular interest for use as bond agents include refractory glass such as the refractory aluminosilicate glasses, specific examples of which are alkali aluminosilicate, alkaline earth aluminosilicate, and alkali-alkaline earth aluminosilicate glasses.

The particle sizes of glass frits to be employed for filter fabrication are preferably finer than those of the ceramics. The size ratio of glass to ceramic average particle size will be in a range of 1:2 to 1:10, and preferred in a range from 1:4 to 1:8.

Glass formation may also be obtained from relatively low melting mineral species such as talc or the alkali feldspars. However, the use of minerals to form a glassy phase will require a firing temperature several hundreds of degrees higher than needed for the direct addition of a glassy phase.

Depending on the size ratio, the percentage of glass by volume in a batch may be varied. The generally preferred ranges are 5 wt % to 30 wt % glass and 70-95 wt % ceramics. Table 1 shows exemplary compositions of the instant invention:

TABLE 1

Ceramic batch types

| Components | Percentage Range (by weight) |
|---|---|
| Ceramics (e.g., SiC, Al2O3, mullite, zircon, . . . ) | 70-95% |
| Glass (e.g., CaO—$Al_2O_3$—$SiO_2$; $K_2O$—CaO—$Al_2O_3$—$SiO_2$; $K_2O$—$Al_2O_3$—$SiO_2$ . . . ) | 5-30% |
| Binder (e.g., methyl cellulose . . . ) | 4-8% addition |
| Lubricant (e.g., stearate soap, mineral oil, tall oil . . . ) | 1-5% addition |
| Water | paste consistency |

Table II below presents exemplary ceramics prepared from batches such as set forth in Table I above.

TABLE II

SiC Ceramic - Aluminosilicate Glass Batches

| Sample No. | Ceramic type - percentage | Average particle size | Glass type - percentage * | Average particle size | Binder (methyl cellulose) | Lubricant (stearate) |
|---|---|---|---|---|---|---|
| 1 | SiC - 90% | 27 um | CaO—$Al_2O_3$—$SiO_2$ - 10% | 10-20 um | 8% | 0.8% |
| 2 | SiC - 90% | 27 um | $K_2O$—CaO—$Al_2O_3$—$SiO_2$ - 10% | 10-20 um | 8% | 0.8% |
| 3 | SiC - 90% | 15 um | $K_2O$—$Al_2O_3$—$SiO_2$ - 10% | 9 um | 8% | 0.8% |

The added (preformed) glass had the following compositions (by weight %): Sample 1: CaO, 18.4; $Al_2O_3$, 38.5; $SiO_2$, 39.5; $ZrO_2$, 3.0; $As_2O_3$, 0.5; Sample 2: $K_2O$, 3.3; CaO, 15.6; $Al_2O_3$, 31.9; $SiO_2$, 46.0; $ZrO_2$, 2.9; $As_2O_3$, 0.5; Sample 3: $K_2O$, 2.4; $B_2O_3$, 23.8; $SiO_2$, 73.8. Batches such as reported in Table II above can be formed into glass-bonded ceramic products, such as DPFs, at low to moderate forming, or firing, temperatures, which are lower than the ceramic sintering temperature of the ceramic material of which the ceramic particles are comprised. That is, the ceramic particles in the present invention are not ceramic-sintered together to form a network. In some embodiments of the present invention, such as for SiC particles, peak firing (forming) temperatures are in the range of 1100 to 1400° C.; such forming temperatures are significantly lower than the sintering temperature of conventional SiC filters, around 2200° C. Accordingly, the SiC ceramic particles are not sinter-bonded to each other to form a network; instead the ceramic particles are sinter-bonded by the glass to form an interconnected network. In other embodiments of the present invention, peak firing (forming) temperatures are less than 1200° C., and in other embodiments less than 1100° C. Examples of forming, or firing, temperatures and resulting properties for the exemplary batches reported in Table II above are set forth in Table III below.

TABLE III

SiC-Glass Products and Properties

| | Sample No. | | |
|---|---|---|---|
| | 1 | 2 | 3 |
| Firing ($T_{max}$/hours) | 1300° C./3 hrs | 1300° C./3 hrs | 1150° C./5 hrs |
| MOR Strength (psi) | 1548 | 4548 | 1623 |
| % Porosity | 44.9% | 44.5% | 40.8% |
| Median Pore Size (μm) | 7.7 | 9.6 | 4.5 |
| CTE (20-800° C.) ($10^{-7}$/C.) | 44.1 | 43.6 | 52 |
| XRD | SiC with minor $SiO_2$ phase | SiC with minor $SiO_2$ phase | SiC with minor cristobalite phase |
| SEM | Uniform bonding, microcracks in ceramic grains only | Uniform bonding | Glassy-wrap SiC structure; some bubbles glassy phase |
| Comment | Good extrusion behavior; uniform pores | Good extrusion behavior; uniform pores | Glass softening @ 820° C. |

The use of high strength and low modulus non-oxide and oxide ceramics with low coefficients of thermal expansion (CTEs) and the absence of microcracks, confers superior thermal shock resistance to the filters. Further, since the fabrication process is a low temperature process, firing cycles are shorter than conventional processes and the firing process can provide superior control over the microstructure (e.g. pore size, pore connectivity, and degree of porosity).

Since the bonding glass phase is not formed in-situ (i.e. during firing), combinations of ceramics and glasses may be used that would not otherwise be combinable if the glass were not pre-formed and inert with respect to the ceramic particles, conferring a great deal of flexibility to product design. This approach permits porosity, grain size and pore size distribution to be exactly tailored to suit the application, most conveniently by changing the particle size and the composition mix of the ceramic and glass powders and without any need to make significant changes to the process parameters. We have obtained resulting filters that exhibit uniform pore size and controlled pore size distribution (e.g. a narrow mono-distribution) that are difficult to achieve in conventional reaction-sintered systems customarily used to produce low expansion microcracked ceramic products.

A porous ceramic structure is disclosed herein comprising non-microcracked ceramic particles are bonded by glass. Preferably, the ceramic particles comprise at least one refractory ceramic. The refractory ceramic can be a non-oxide ceramic or an oxide ceramic. In some embodiments, the refractory ceramic is a non-oxide ceramic selected from the group consisting of SiC, Si—SiC and Si3N4-SiC composites. In other embodiments, the at least one refractory ceramic is selected from the group comprising: sintered cordierite, mullite, zircon, alumina, and aluminum titanate. In some embodiments, the average particle size of the ceramic particles lies in the range 10 to 40 microns. Preferably, the glass and the ceramic particles form an interconnected porous network.

A method of making a ceramic body is also disclosed herein comprising: providing at least one non-microcracked refractory ceramic powder selected from the group consisting of: SiC, Si—SiC, $Si_3N_4$—SiC composites, sintered cordierite, mullite, zircon, alumina, and aluminum titanate; providing a refractory glass powder of a composition suited to wetting the particles of the ceramic powder; mixing the ceramic and glass powders with binders and lubricants to form a homogeneous extrudable composition; extruding the composition into an extruded structure; and sintering the extruded structure to a peak temperature in the range 800-1400° C. for a period ranging from 1 to 12 hrs. In some of these embodiments: the ceramic powder has an average particle size in the range of 10 to 40 microns; the glass powder is provided as a glass frit having an average particle size that is 1/10 to 1/2 the particle size of the ceramic powder; and/or the homogeneous extrudable composition comprises 70-95 vol % of ceramic powder and 5-30 vol % of glass powder.

A glass-bonded ceramic honeycomb structure is also disclosed herein comprising: substantially non-microcracked ceramic particles bound together by glass, the structure having a porosity in the range 40 to 60% and a median pore-size in the range 7 to 30 microns. In some embodiments, the substantially non-microcracked ceramic particles are comprised of SiC.

A method of making a ceramic body is also disclosed herein comprising providing non-microcracked refractory ceramic particles; providing refractory glass; mixing the ceramic particles and glass with a binder and a lubricant to form a mixture; extruding the mixture into an extruded structure; and heating the extruded structure for a time and to a temperature sufficient to soften the glass and wet the ceramic particles with the glass but below the ceramic-sintering temperature of the ceramic particles, and thereafter allowing the extruded structure to cool, thereby forming glass bonds between the ceramic particles, to form the ceramic body. In some of the embodiments, the ceramic particles have an average ceramic particle size of less than 40 μm. In some of the embodiments, the glass is provided as glass particles having an average glass particle size of less than 25 μm. In some of the embodiments, the ceramic particles have an average ceramic particle size, and the glass is provided as glass particles having an average glass particle size less than one-half the average ceramic particle size. In some of the embodiments, the ceramic particles have an average ceramic particle size, and the glass is provided as glass particles having an average glass particle size less than one-fourth the average ceramic particle size. In some of the embodiments, the ceramic particles have an average ceramic particle size, and the glass is provided as glass particles having an average glass particle size less than one-half and greater than one-tenth the average ceramic particle size. In some of the embodiments, the maximum firing temperature is less than 1400° C.; in other embodiments less than 1200° C.; in other embodiments less than 1100° C. In some of the embodiments, the extruded structure is exposed to the maximum temperature for less than 6 hours, and in other embodiments for 1 to 6 hours.

What is claimed is:

1. A glass-bonded ceramic honeycomb structure having a porosity in the range 40 to 60%, a median pore size in the range 7 to 30 microns, and a non-microcracked microstructure comprising non-microcracked ceramic particles bound together into an interconnected porous network by a pre-formed glass phase comprising substantially no microcracks.

2. The honeycomb structure of claim 1 wherein the non-microcracked ceramic particles are comprised of silicon carbide.

3. The honeycomb structure of claim 1 wherein the non-microcracked ceramic particles are comprised of sintered cordierite.

4. The honeycomb structure of claim 1 wherein the non-microcracked ceramic particles are comprised of aluminum titanate.

5. The honeycomb structure of claim 1 wherein the pre-formed glass phase is a refractory aluminosilicate glass.

6. The honeycomb structure of claim 1 wherein the pre-formed glass phase is selected from the group consisting of alkaline earth aluminosilicate glasses, alkali aluminosilicate glasses, and alkali-alkaline earth aluminosilicate glasses.

* * * * *